United States Patent [19]

Stolzenburg et al.

[11] Patent Number: 4,521,506
[45] Date of Patent: Jun. 4, 1985

[54] MONOAZO PYRIDINOL DYES CHELATED OR CAPABLE OF BEING CHELATED WITH METAL IONS AND THEIR USE FOR IMAGE PRODUCTION

[75] Inventors: Rudolf Stolzenburg, Langenfold; Peter Bergthaller, Cologne; Gerhard Wolfrum, Leverkusen; Jürgen Strauss, Cologne, all of Fed. Rep. of Germany

[73] Assignee: Agfa-Gevaert Aktiengesellschaft, Leverkusen, Fed. Rep. of Germany

[21] Appl. No.: 617,499

[22] Filed: Jun. 5, 1984

[30] Foreign Application Priority Data

Jun. 18, 1983 [DE] Fed. Rep. of Germany ....... 3322058

[51] Int. Cl.$^3$ .......................... G03C 1/40; G03C 5/51
[52] U.S. Cl. .................................... 430/241; 430/222; 430/223; 430/242; 430/562
[58] Field of Search ............... 430/223, 225, 226, 222, 430/562, 241, 242

[56] References Cited

U.S. PATENT DOCUMENTS

| 4,142,891 | 3/1979 | Baigrie et al. | 430/223 |
| 4,195,994 | 4/1980 | Chapman | 430/223 |
| 4,287,292 | 9/1981 | Chapman et al. | 430/223 |
| 4,418,143 | 11/1983 | Bergthaller et al. | 430/223 |

Primary Examiner—Richard L. Schilling
Attorney, Agent, or Firm—Connolly and Hutz

[57] ABSTRACT

Azo dyes corresponding to the formula (I):

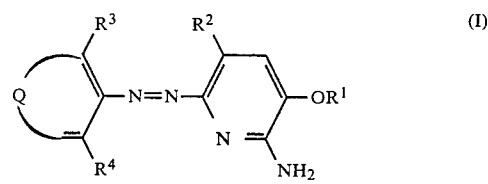

wherein $R^1$ represents a releasable group, $R^2$ represents H, halogen or sulphonyl, $R^3$ and $R^4$ represent H or groups not capable of chelate formation, and Q represents a group for completing a phenyl or naphthyl group, combine with nickel ions to form stable azo dye-metal complexes which have advantageous spectral properties. They are therefore particularly suitable for the production of highly light-fast magenta images, e.g. by the ink jet process, in which they may be used directly in the form of colored inks, or by the dye diffusion transfer process, in which they are released imagewise from suitable dye-releasers in the course of development and transferred to a dye-receptive layer.

3 Claims, No Drawings

MONOAZO PYRIDINOL DYES CHELATED OR CAPABLE OF BEING CHELATED WITH METAL IONS AND THEIR USE FOR IMAGE PRODUCTION

This invention relates to new azo dyes which are capable of forming complexes with metal ions and which form stable magenta coloured dye-metal complexes particularly with nickel ions, and it also relates to the use of these dyes for the production of light-fast magenta images, e.g. by the ink jet process or the dye diffusion transfer process.

The invention further relates to a colour photographic recording material for the production of colour images by the dye diffusion transfer process, said material containing, in association with at least one light-sensitive silver halide emulsion layer, a non-diffusible, colour-providing compound from which a diffusible, complex-forming azo dye is released during development.

The dye diffusion transfer process is based on the production of an imagewise distribution of diffusible dyes in a light-sensitive element in the course of development, these dyes being produced in correspondence with a preceding exposure and transferred to an image receptor element. It is known that the light-fastness of colour images produced by such a process may in some cases be improved by using dyes capable of forming complexes with metal ions, e.g. dyes which form stable dye-metal tridentate complexes if subsequently treated with suitable metal ions. The fact that the light-fastness of azo dye images which have been produced by the dye diffusion transfer process or some other photographic process, such as the silver dye bleaching process, may be improved by complex formation with metal ions has been disclosed, for example, in DE-B-1 116 532 and DE-B-1 125 279.

6-Arylazo-3-pyridinol dyes which may be released from dye-releasers and which form coloured complexes with metal ions have been disclosed in US-A-4 142 891, US-A-4 195 994 and US-A-4 142 292. The known dyes contain a chelatable group in the aryl moiety adjacent to the azo group and accordingly form cyan or magenta dye-metal tridentate complexes with metal ions. These complexes are said to have good spectral properties.

The present invention is based on the problem of preparing monoazo dyes which are capable of after-metallization and which, in the form of their metal complexes, are distinguished by their exceptionally clear magenta colour tones and their exceptionally high light-fastness.

It has been found that this problem may be solved by the preparation of monoazo dyes corresponding to the following formula (I):

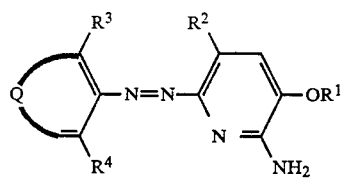

wherein
Q represents the group required for completing a phenyl or naphthyl group, $R^1$ represents H or a group capable of being released under alkaline conditions, $R^2$ represents H, halogen, e.g. Cl, or an alkylsulphonyl or arylsulphonyl group, and $R^3$ and $R^4$ (identical or different) represent H or a substituent which is not capable of chelate formation.

The new invention relates to new monoazo dyes of the above formula (I) and their metal complexes, in particular their nickel complexes.

The invention further relates to the use of the azo dyes corresponding to formula (I) for the production of light-fast magenta images, e.g. by the Ink Jet process or by the dye diffusion transfer process.

The invention in addition relates to a colour photographic recording material for the production of colour images by the dye diffusion transfer process, which material contains, in association with at least one light-sensitive silver halide emulsion layer, a non-diffusible, colour-providing compound (dye-releaser) from which there is released, under the conditions of alkaline development and as a function of the development of the silver halide emulsion layer, a diffusible monoazo dye capable of forming complexes with metal ions, characterised in that the monoazo dye corresponds to formula (I).

Lastly, the invention relates to a colour image consisting of an imagewise distribution of a magenta dye on a layer support, characterised in that the magenta dye is a nickel complex of a monoazo dye of formula (I).

Preferred monoazo dyes of the present invention in particular correspond to the following formula (II):

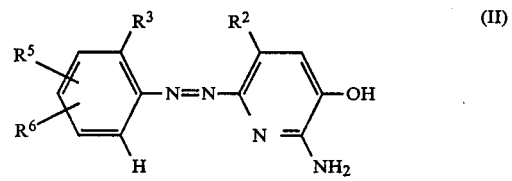

wherein $R^2$ and $R^3$ have substantially the meaning already indicated and $R^5$ and $R^6$ represent hydrogen or any substituents.

The substituents represented by $R^3$ (other than H) may be, for example, halogen, e.g. Cl or Br, alkyl, alkoxy, CN, CF$_3$ or carbamoyl; or $R^3$ and $R_5$ together represent a group for completing a condensed, optionally substituted benzene ring.

The substituents represented by $R^5$ and $R^6$ (other than H) may be, for example, halogen, e.g. Cl or Br, CN, carbalkoxy, carbamoyl, sulphinic acid(sulphinate), sulphonic acid (sulphonate), sulphamoyl, alkylsulphonyl, arylsulphonyl or (in the m-position to the azo group) NO$_2$; or $R^5$ together with $R^3$ or together with $R_6$ represents a group for completing a condensed, optionally substituted benzene ring.

The alkyl groups mentioned in the definitions of $R^2$ to $R^6$ preferably contain not more than 4 carbon atoms; preferred examples are: methyl, ethyl, n-propyl, isopropyl, and n-butyl.

The aryl groups mentioned in the definitions of $R^2$, $R^5$ and $R^6$ are preferably phenyl groups. They may be further substituted, e.g. by halogen, alkyl, alkoxy, acylamino, sulphamoyl or sulphinate, but they preferably do not contain more than 10 carbon atoms, including those present in such substituents.

The above-mentioned carbamoyl groups and sulphamoyl groups may be unsubstituted on the nitrogen atom or they may be monosubstituted or disubstituted by alkyl or aryl or they may be substituted with a group which, together with the nitrogen atom, completes the ring of a cyclic amino group, e.g. a pyrrolidine, piperidine, perhydroazepine, morpholine, indoline or tetrahydroquinoline ring.

Acyl groups (acylamino) are generally derived from aliphatic or aromatic carboxylic or sulphonic acids, from carbamic acids or sulphonic acids or from carbonic acid semi-esters. Hydrolysable acyl groups in particular are derived from aliphatic carboxylic acids or carbonic acid semi-esters.

The above particulars completely describe the chromophoric system which is responsible for the spectral properties of the monoazo dyes according to the invention.

The dyes form stable dye-metal complexes with metal ions. These complexes are presumably dye-metal bidentate complexes.

Suitable metal ions include, for example, the ions of Cu, Ni, Co, Al and Zn. Nickel complexes are preferred on account of their clear magenta colour tones.

The dyes may also contain additional substituents suitable for adapting them to special purposes. Thus, when the dyes of formula (I) are to be used in the dye diffusion transfer process, they may contain, e.g. in the form of one of the groups already mentioned above in the definitions of $R^1$ to $R^6$ or in the form of substituents optionally attached to one of the said groups through a suitable linking member, suitable functional groups for providing advantageous diffusion and mordanting characteristics, e.g. anionic or anionizable groups such as sulphonate, sulphinate, phenolate, carboxylate, disulphimide or sulphamoyl groups, or they may contain a functional group resulting from the splitting of a bond on a carrier group carrying a ballast group, such a functional group being characteristic of the nature of the carrier group and the nature of the band. The last mentioned functional group may be identical with the previously mentioned groups modifying the diffusion and mordanting charateristics. The functional group may be attached, for example, to an alkyl, hetaryl or alkyl group, which in turn may be a constituent of one of the substituents mentioned under $R^1$ to $R^6$. Such functional groups are generally not required in the Ink Jet process.

One characteristic of the new dyes according to the invention corresponding to formula (I) is that their absorption spectra are shifted towards shorter wavelengths compared with those of the complexes.

When the dye diffusion transfer process is employed, formulae (I) and (II) represent the diffusible dyes released according to the invention in the process of development. These dyes are released from suitably incorporated non-diffusible colour-providing compounds (dye-releasers). These are compounds in which a dye residue corresponding to formula (I) or (II) is attached to a carrier group CAR containing at least one ballast group, optionally with interposition of a suitable linking member between the dye residue and the carrier group.

The link between the dye of formula (I) and the carrier group may be formed, for example, by one of the substituents $R^1$ to $R^6$. The dye-releasers according to this invention may thus be represented by the following formula (III):

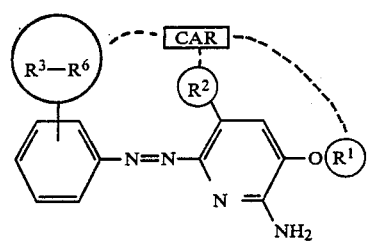

(III)

wherein
$R^1$ to $R^6$ have the meanings already indicated,
CAR denotes a carrier group containing at least one group which confers diffusion resistance, and the broken lines indicate possible linkage points. In the dye-releaser according to the invention corresponding to formula (III), therefore, the carrier group is present as a substituent in one of the groups $R^1$ to $R^6$.

In addition to containing the group which confers diffusion resistance, the carrier group CAR contains at least one group capable of being split up as a function of development of a silver halide emulsion layer so that the dye attached to the carrier group, optionally together with a small fragment of the original carrier group, may be separated from the group conferring diffusion resistance and thus released from its attachment to the layer. The carrier groups may vary in structure according to the mode in which the releasable group functions.

The dye-releasers according to this invention may be any of a wide variety of types of compounds which are all characterised by a linking member which is redox dependent in the strength of its bond and which links the chromophore to the diffusion-resistant carrier group.

A comprehensive exposition of this subject may be found in Angew. Chem. Int. Ed. Engl. 22, 191–209 (1983) in which the most important of the known systems are described.

Particularly advantageous systems are the redox-active dye-releasers corresponding to the formula

BALLAST-REDOX-DYE, wherein
BALLAST denotes a ballast group,
REDOX denotes a redox-active group, i.e. a group which is capable of being oxidized or reduced under the conditions of alkaline development and which, depending upon whether it is present in the oxidized or the reduced state, is subject, to varying degrees, to an elimination reaction, a nucleophilic displacement reaction, hydrolysis or some other decomposition reaction, with the result that the DYE residue is released, and
DYE denotes the residue of a diffusible dye, in the present case a dye corresponding to the formula (I).

Ballast groups enable the dye-releasers according to the invention to be incorporated in a diffusion-fast form in the hydrophilic colloids conventionally used in photographic materials. Particularly suitable for this purpose are organic groups, generally containing straight-chained or branched aliphatic groups generally having from 8 to 20 carbon atoms and optionally also containing carbocyclic or heterocyclic, optionally aromatic groups. These groups are linked to the remainder of the molecule either directly or indirectly, e.g. through one of the following groups: NHCO, NHSO$_2$, NR (wherein R denotes hydrogen or alkyl), O or S. The ballast group may in addition contain groups conferring solubility in water, e.g. sulpho groups or carboxyl groups, and these may be present in anionic form. Since the diffusion characteristics depend upon the molecular size of the whole compound, it is sufficient in certain cases, e.g. if the molecule as a whole is large enough, to use only short-chained groups as ballast groups.

Redox-active carrier groups having the structure: BALLAST-REDOX- and dye-releasers related thereto are known in various forms. No detailed description is necessary here in view of the above mentioned comprehensive article in Angew. Chem. Int. Ed. Eng. 22, 191-209 (1983).

Some examples of formulae of redox-active carrier groups which are split off as a function of a preceding imagewise oxidation or reduction are shown below purely by way of illustration:

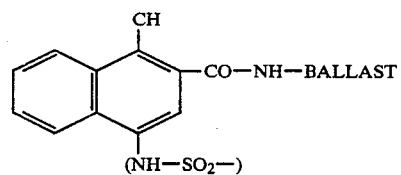

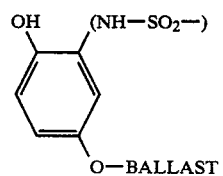

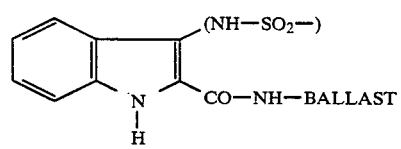

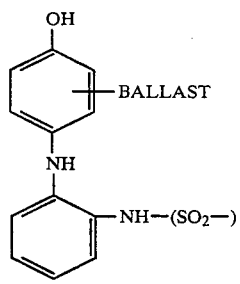

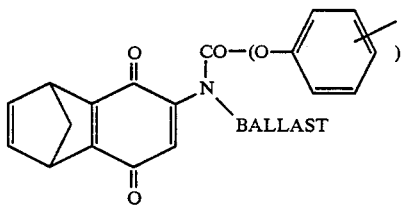

-continued

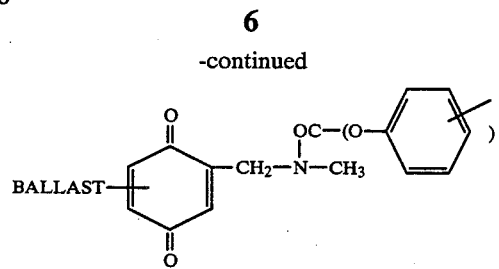

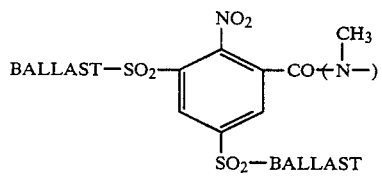

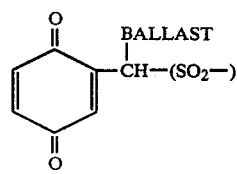

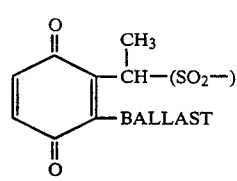

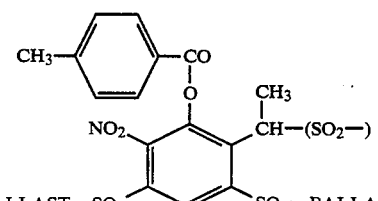

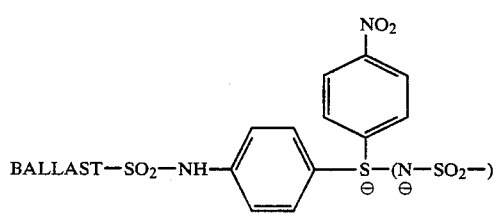

The groups in brackets are functional groups of the dye residue and are released together with this residue from the remaining part of the carrier group. The functional group may be a substituent covered by the definition of groups $R^1$ to $R^6$ in formulae (I) and (II) and may have a direct influence on the absorption and complex-forming characteristics of the dyes according to the invention. On the other hand, the functional group may be separated from the chromophore of the dye according to the invention by an intermediate member if it is present as a substituent in one of the groups $R^1$ to $R_6$, without necessarily exerting any influence on the absorption and complex-forming properties. The functional groups may also play a role together with the intermediate member in determining the diffusion and mordanting characteristics of the dyes according to the invention. The intermediate members may be, for example, alkylene or arylene groups.

The last mentioned classes of reducible dye-releasers which may release the dyes when reduced are advantageously used together with so-called electron donor compounds (ED compounds). The latter function as reducing agents which are used up imagewise during development of the silver halide, and the unused portion of the reducing agent reduces the associated dye-releaser thereby causing the dye to be released. Suitable ED compounds include, for example, non-diffusible or only slightly diffusible derivatives of hydroquinone, of benzisoxazolone, of p-aminophenol or of ascorbic acid (e.g. ascorbyl palmitate); these have been described, for example, in DE-A-2 809 716. Particularly suitable ED compounds are disclosed in DE-A-3 006 268.

The following are examples of suitable ED compounds:

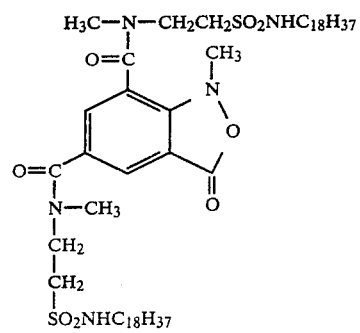

ED 1

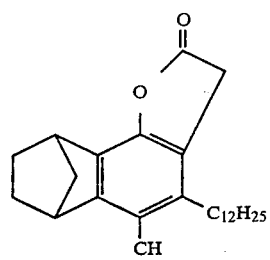

ED 2

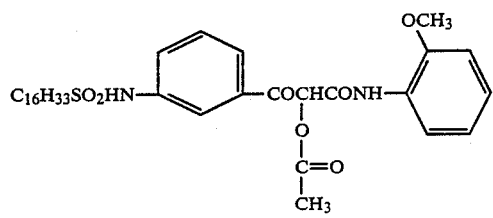

ED 3

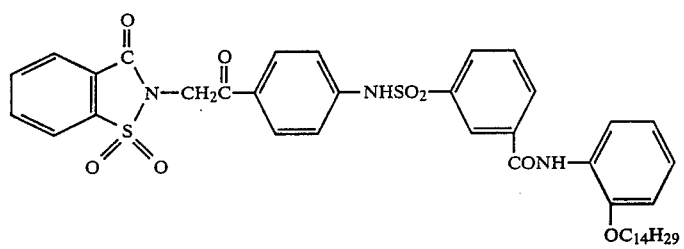

ED 4

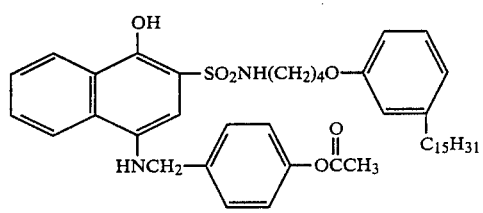

ED 5

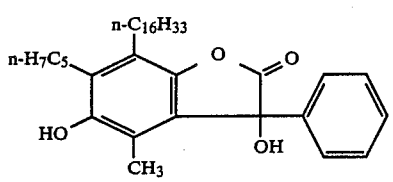

ED 6

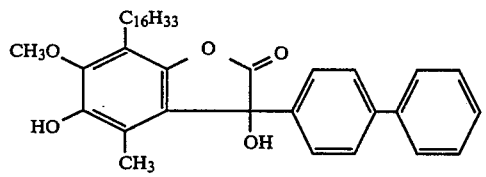
ED 7
-continued
Examples of monoazo dyes of formula (I) according to the invention which may be metallised to form magenta nickel complexes with suitable absorption characteristics and excellent light-fastness are given below:
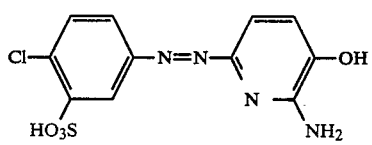
Dye 1
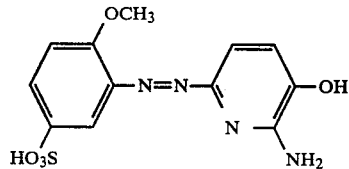
Dye 2
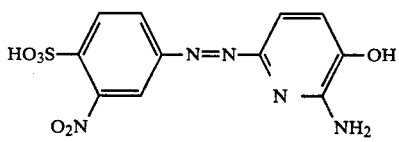
Dye 3
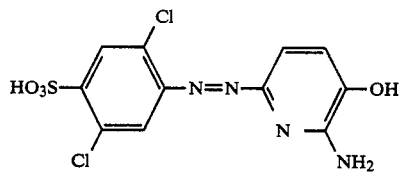
Dye 4
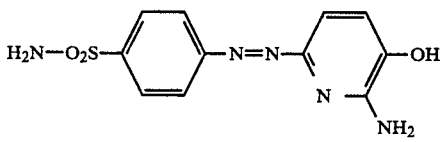
Dye 5
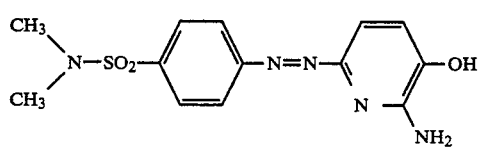
Dye 6
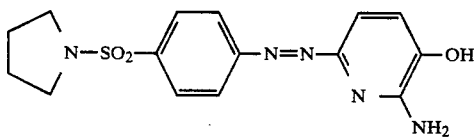
Dye 7
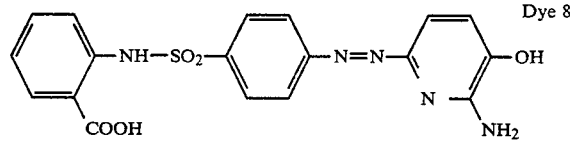
Dye 8
Dye 9
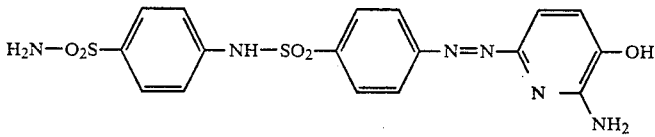
Dye 10
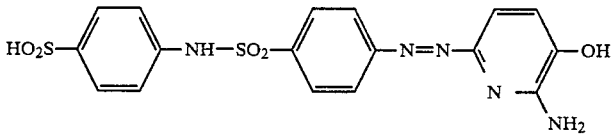
Dye 11
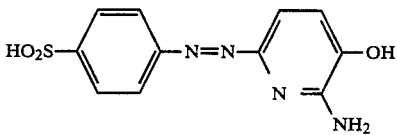
Dye 12
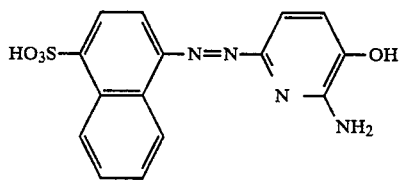

-continued
Dye 13
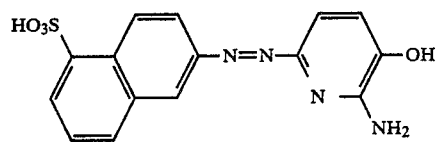
Dye 14
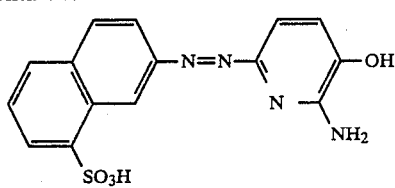
Dye 15
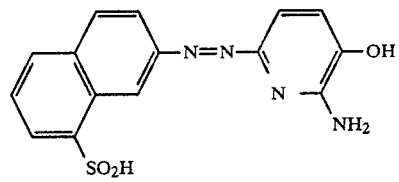
Dye 16
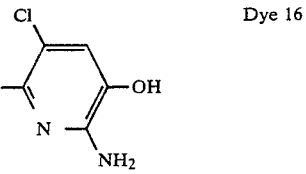
Dye 17
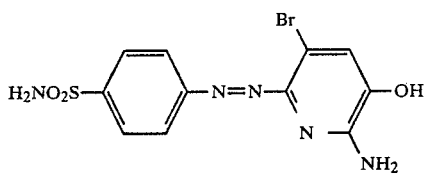
Dye 18
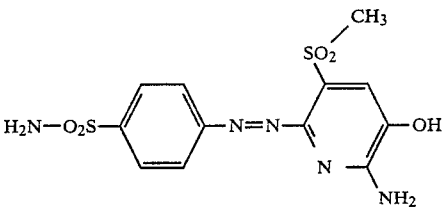
Dye 19
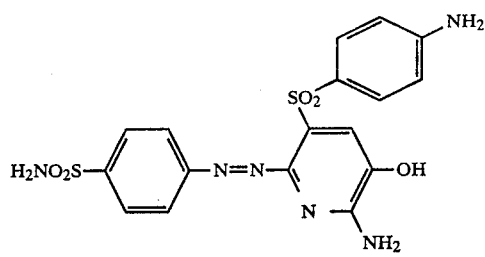
Dye 20
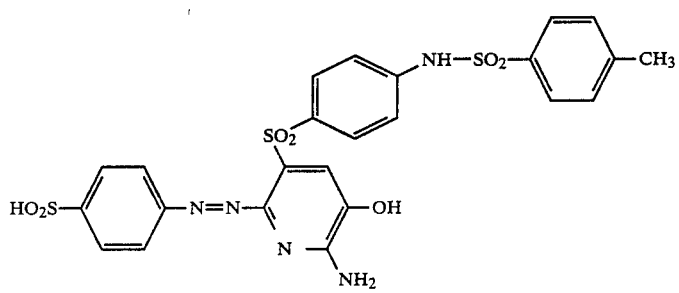
Dye 21
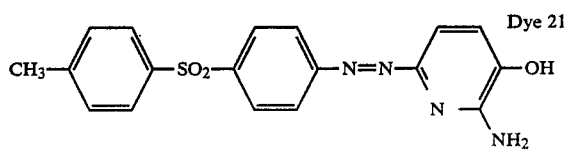
Dye 22
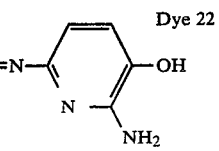
Dye 23
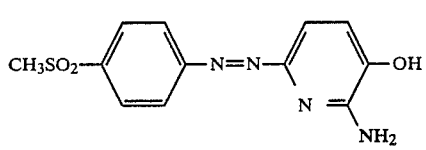
Dye 24
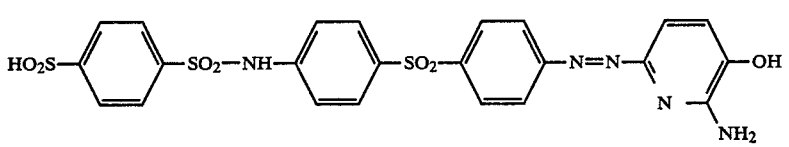

-continued

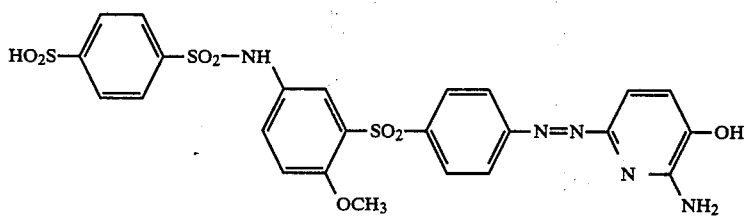
Dye 25

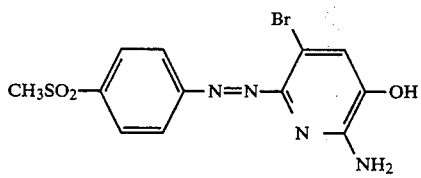
Dye 26

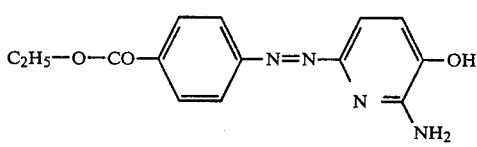
Dye 27

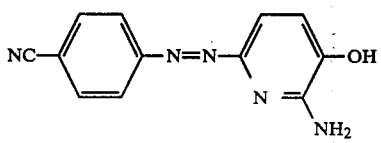
Dye 28

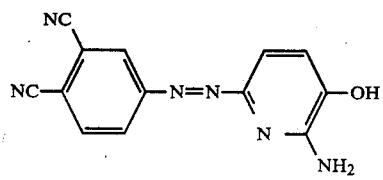
Dye 29

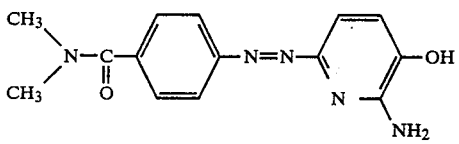
Dye 30

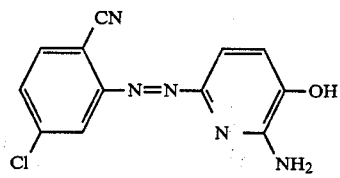
Dye 31

The dyes are prepared in known manner by the coupling of diazotised amines corresponding to formula (IV):

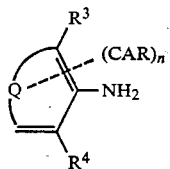
(IV)

in an aqueous, organic or aqueous-organic medium with coupling components corresponding to formula (V):

(V)

the groups Q, $R^2$, $R^3$, $R^4$ and CAR in formulae (IV) and (V) having the meaning already indicated while $R^8$ represents hydrogen or optionally an acyl protective group and n represents 0 or 1. The latter and the broken lines denote that the amine of formula (IV) may be attached to the group CAR at this stage.

When $R^2$ is a sulphonyl group, preparation of the dyes is carried out by coupling of the diazotised amine with a halogenated aminopyridinol followed by reaction of the crude or purified dye with an alkyl sulphinate or aryl sulphinate in a solvent which preferably may be aprotic. A reaction of this kind is fully described in EP-A-0 063 808.

$R^8$ in this case represents an acyl protective group which, after coupling and a secondary reaction replacing halogen by sulphinate, may be used to protect both the amino and the OH group against attack by acylating or sulphonylating reactants, e.g. "carrier sulphochloride", and direct the linkage to a specified linkage position.

The following are suitable diazo components: anilines, anilinosulphonic acids and their derivatives, naphthylaminosulphonic acids and their derivatives, anisidine sulphonic acids and their derivatives, chlorinated anilinosulphonic acids and their derivatives, p-aminophenylsulphones, and cyanoanilines.

The diazo components must not contain any nitro group in the para-position to the amino group.

The following are suitable coupling components (V):
2-aminopyridinol-3,
2-amino-5-bromopyridinol-3,
2-amino-5-chloropyridinol-3,
2-acetaminopyridinol-3,
2-benzamidopyridinol-3,
2-benzenesulphonamidopyridinol-3,
2-acetamino-5-chloropyridinol-3,
2-benzamido-5-bromopyridinol-3, and
2-phenoxycarbonylamido-5-bromopyridinol-3.

The preparation of the dyes according to the invention is described below with reference to a representative example.

Dye 5

1.72 g (0.01 mol) of sulphanilamide are diazotised in 20 ml of water and 3 ml of 36% hydrochloric acid at 0°–5° C. with 0.7 g of sodium nitrite in 3 ml of water. The reaction mixture is stirred for a further 30 minutes, the nitrite excess is destroyed with amidosulphonic acid and the diazonium salt solution obtained is introduced into a solution of 1.1 g of 2-aminopyridinol-3 (0.01 mol) and 4.2 g of potassium carbonate in 30 ml of water. The temperature of the coupling mixture is maintained at 0°-10° C. for 2 hours and the resulting dye is then suction-filtered. The dry product is purified by repeated boiling with acetone. The acetonic solutions contain a dye of uniform composition and are concentrated by evaporation. Yield: 1.6 g (55% of theoretical yield).

The dyes according to the invention may be used directly in the form indicated, e.g. for the Ink Jet process, in which case the dyes are used to prepare aqueous or nonaqueous coloured inks in known manner. The formation of highly light-fast, brilliant dye-metal complexes may be achieved, for example, by using a recording carrier containing a layer which is impregnated with a salt of the required heavy metal, in the present case preferably nickel. Information on the Ink Jet process may be found in a lecture on this subject by R. Meyer and K. Hoffmann, Kongressband, 4th International Congress for Reprography and Information, 1975, pages 184–199.

The dyes used for the dye diffusion transfer process are diffusible dyes released from the corresponding dye-releasers or model dyes which may be obtained by known methods of preparation without deleterious change in light-fastness and absorption to form dye releasers containing releasable carrier groups from which the dyes according to the invention are released imagewise as a result of development.

The following are examples of dye-releasers according to the invention:

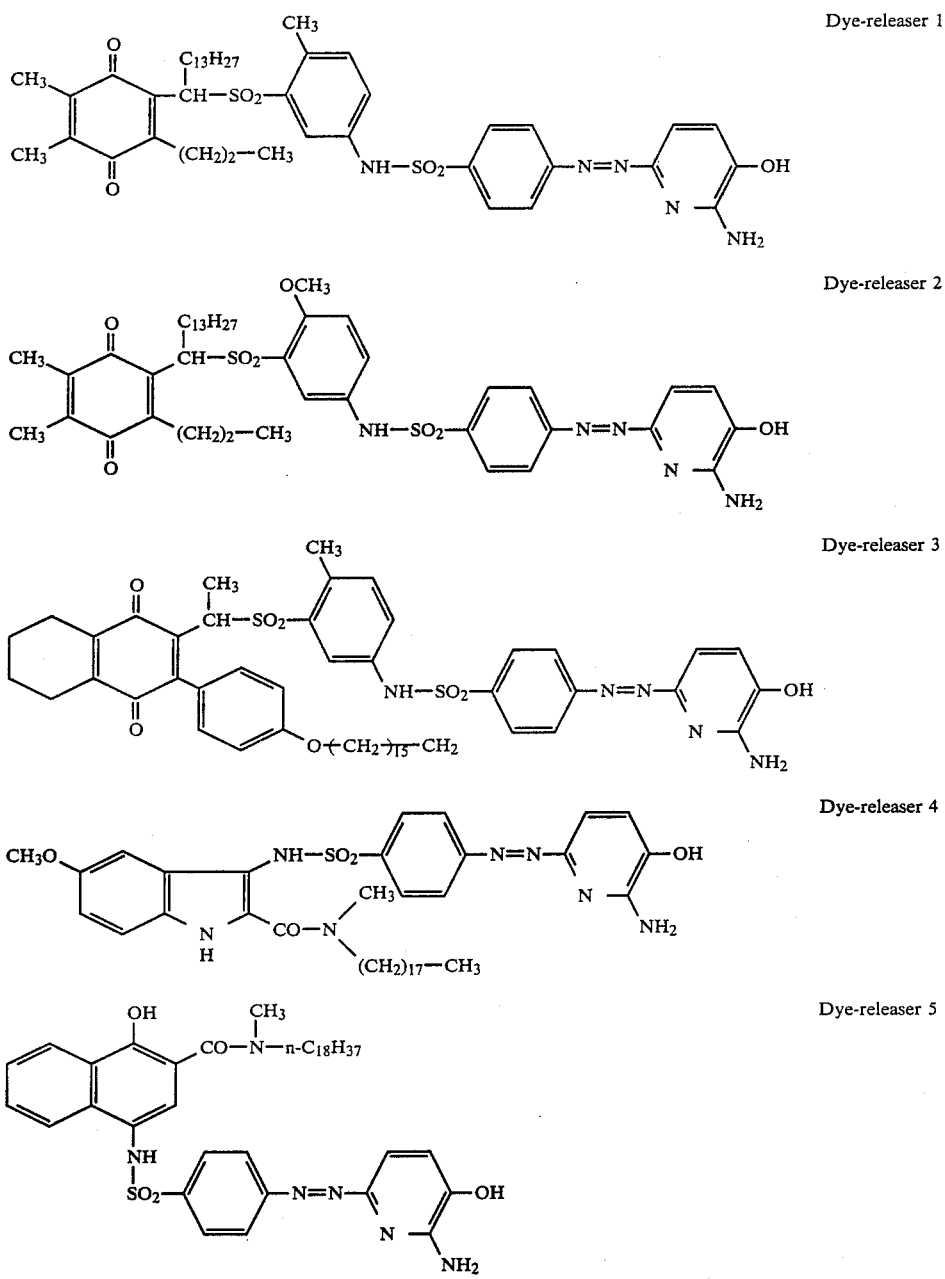

Dye-releaser 1

Dye-releaser 2

Dye-releaser 3

Dye-releaser 4

Dye-releaser 5

-continued

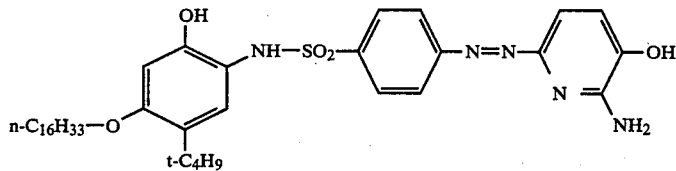

Dye-releaser 6

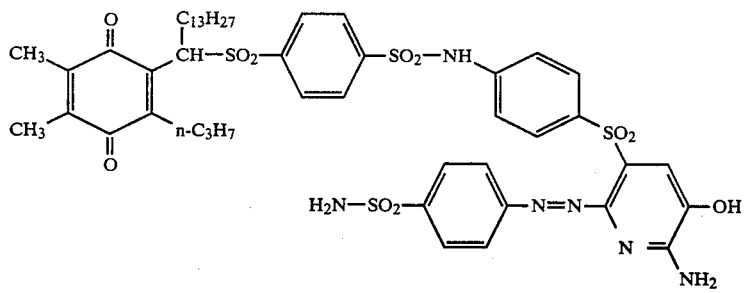

Dye-releaser 7

Preparation of the dye-releasing compounds according to the invention is described below with reference to a representative example.

Dye-Releaser 1

Precursor 1.1

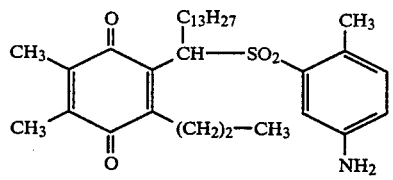

The method of preparation is described in DE-A-3 107 540, pages 51 and 52.

Precursor 1.2

4.7 g of 4-acetaminobenzene sulphochloride are added to 10.9 g of Precursor 1.1 in 200 ml of anhydrous dichloromethane and 7 ml of pyridine. The reaction mixture is then stirred for 5 hours at room temperature and concentrated in a rotary evaporator, and the residue is stirred up with water.

The aqueous phase is decanted off and the reaction mixture is again stirred up with 300 ml of methanol. Precursor 1.2 precipitates after some time from the solution initially formed. The precipitate is separated by suction filtration and dried in air. Yield: 13.5 g of yellowish powder (91% of theoretical yield).

Precursor 1.3

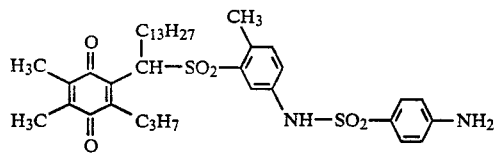

Precursor 1.2 in 150 ml of ethanol is boiled under reflux with 6 ml of 36% hydrochloric acid for 30 minutes and the resulting reaction mixture is concentrated in a rotary evaporator, decanted with 150 ml of water, stirred for 2 hours, suction-filtered, washed with 100 ml of water and stirred up with 50 ml of methanol without previous dehydration. The product is then suction-filtered and dried in air.

Dye-releaser 1

7 g of Precursor 1.3 (10 mmol) are dissolved in 70 ml of acetone and then diazotised with 1.8 ml of 40% nitrosyl sulphuric acid at $-5°$ C. after the addition of 1.5 ml of 96% sulphuric acid. The reaction mixture is then stirred for 60 minutes, 0.1 g of urea is added, the mixture is again stirred for 10 minutes and the resulting solution of the diazonium salt is introduced into a mixture, cooled to $0°$ C., of 1.1 g of 2-aminopyridinol-3, 9 g of potassium carbonate, 50 ml of acetone and 5 ml of water.

Stirring is then continued for 4 hours at $0°$ C. and the reaction is left to continue overnight, during which time the temperature rises to $20°$ C. The product is then poured into 500 ml of water, stirred for 15 minutes, suction-filtered, carefully washed with water, and dried.

The crude product dissolved in 30 ml of dichloromethane is applied to a column of 1000 g of silica gel/-Woelm (32–63 $\mu$m) and eluted with dichloromethane/-methanol under pressure. 4.8 g of pure substance (uniform product according to thin layer chromatography on silica gel 60 F 254/Merck using dichloromethane/-methanol 98:2) are obtained from 7.1 g of crude product.

The dye-releasers according to the invention are associated with a light-sensitive silver halide emulsion layer to be incorporated in a colour photographic recording material for the dye diffusion transfer process. A recording material of this kind contains at least one light-sensitive silver halide emulsion layer if it is to be used for a monochromatic process and generally at least three such layers for the production of multicolour images, in which case the various silver halide emulsion layers differ in their spectral sensitivity. According to the invention, at least one of these layers has a dye-releaser corresponding to formula (III) associated with it. The dye-releasers yield diffusible dyes on development, and, after diffusion into an image receptor layer, these dyes are converted into magenta image dyes by complex formation with nickel ions. The dye-releasers according to the invention are therefore preferably associated with a green-sensitive silver halide emulsion layer.

The terms "association" and "associated" are understood to mean that the arrangement of the light-sensitive silver halide emulsion layer and of the dye-releaser in relation to each other is such that they are capable of interacting during development so that the diffusible monoazo dye which is capable of forming a complex with nickel ions may be released as a function of the development of the silver halide emulsion layer. The light-sensitive silver halide and the dye-releaser need not necessarily be present in the same layer for this purpose but may be accommodated in adjacent layers, both belonging to the same layer unit.

If the dye-releasers according to the invention are reducible compounds capable of undergoing splitting by reduction and preferably used together with ED compounds (or their precursors, e.g. according to DE-A-3 006 268), the term "association" means that the silver halide emulsion, ED compound or ED precursor compound and the dye-releasers are arranged in such positions in relation to each other that they are capable of interacting to achieve an imagewise correspondence between the silver image formed and the consumption of ED compound on the one hand and between unused ED compound and the dye-releaser on the other hand, so that imagewise distribution of diffusible dye is obtained in correspondence with the undeveloped silver halide.

Although various methods may be used for incorporating the dye-releasers according to the invention, it has been found convenient to incorporate these compounds in the layers in the form of emulsions, using so-called oil formers. This has the advantage, particularly when reducible dye-releasers split by reduction are used in combination with ED compounds, that the dye-releasers and the ED compounds may be brought into very close functional contact with each other in the form of a common emulsion. Suitable oil formers have been described, for example, in US-A-2 322 027, DE-A-1 772 192, DE-A-2 042 659 and DE-A-2 049 689. The optimum quantity of dye-releaser to be incorporated and optionally of the ED compound may be determined by simple, routine tests. For example, the dye-releaser according to the present invention may be incorporated in quantities of from 0.05 to 0.2 mol per mol of silver halide and the ED compound, if used, in quantities of from 0.1 to 0.6 mol per mol of silver halide.

Development of the colour photographic recording material according to the invention which has been exposed imagewise is initiated by treatment of the material with an aqueous-alkaline, optionally highly viscous developer solution. The auxiliary developer compounds required for development may either be contained in the developer solution or may be partly or completely contained in one or more layers of the colour photographic recording material according to the invention. When development takes place, diffusible dyes are released in imagewise distribution from the dye-releasers and are transferred to an image receptor layer which may either be an integral constituent of the colour photographic recording material according to the invention or in contact with the said material, at least during the time of development. The image receptor layer may therefore be arranged on the same layer support as the light-sensitive element or it may be arranged on a separate layer support, It consists substantially of a binder containing mordant for fixing the diffusible dyes released from the non-diffusible dye-releasers. The mordants used for anionic dyes are preferably long-chained quaternary ammonium or phosphonium compounds, e.g. those described in US-A-3 271 147 and US-A-3 271 148. Certain metal salts and their hydroxides which form sparingly soluble salts with acid dyes may also be used. Polymeric mordants should also be mentioned, such as those described in DE-A-2 315 304, DE-A-2 631 521 and DE-A-2 941 818. The dye mordants in the mordant layer are dispersed in one of the usual hydrophilic binders such as gelatine, polyvinyl pyrrolidone or partially or completely hydrolysed cellulose esters. Some binders may, of course, also function as mordants, e.g. polymers of quaternary bases containing nitrogen, such as 2-methyl-4-vinylpyridine, 4-vinylpyridine or 1-vinylimidazole, as described, for example, in US-A-2 484 430. Guanylhydrazone derivatives of alkyl vinyl ketone polymers as described, for example, in US-A-2 882 156 and quanylhydrazone derivatives of acylstyrene polymers as described, for example, in DE-A-2 009 498 are also suitable binders, but the last mentioned mordanting binder would generally be used in combination with other binders, e.g. gelatine.

In the present case, the image receptor layer or a layer adjacent thereto may also contain heavy metal ions, in particular nickel ions, which may react with the monoazo dyes according to the invention diffusing into the layer to form the corresponding azo dye-metal bidentate complexes which have the above-mentioned advantageous properties of absorption and stability. The nickel ions may be bound in complex form in the image receptor layer, e.g. bound to certain polymers as described, for example, in Research Disclosure 18 534 (September, 1979) or in DE-A-3 002 287 and DE-A-3 105 777. Alternatively, the azo dye-metal complexes may be produced after their diffusion into the image receptor layer by treating the image receptor layer containing the imagewise distribution of dyes according to the invention with a solution of a salt of one of the above-mentioned heavy metals. The dye-releasers left behind in imagewise distribution after development (as a negative of the transferred image) in association with the originally light-sensitive layers may also be converted into the corresponding azo dye metal complexes ("retained image") by treatment with nickel ions. The colour image produced in the colour photographic material according to the invention in all cases consists of an imagewise distribution of nickel complexes of the dye-releasers according to the invention or of the azo dyes released from them and optionally also other dyes, which latter are fixed in the image receptor layer by means of the mordants present therein.

If the image receptor layer is left in contact with the light-sensitive element after development has been completed, a light-reflective layer of binder which contains pigments and is permeable to alkalies is generally arranged between these two layers to provide optical separation between the negative and positive and serve as an aesthetically pleasing background for the transferred colour image.

Such a light-reflective layer may already be preformed in the light-sensitive colour photographic material in known manner or it may be produced in the course of development, also in known manner. If the image receptor layer is arranged between the layer support and the light-sensitive element and is separated from the light-sensitive element by a preformed light-reflective layer, then the layer support must either by transparent so that the colour transfer image produced can be viewed through it or the light-sensitive element must be removed from the image receptor layer together with the light-reflective layer to expose the image receptor layer. Alternatively, the image receptor layer may be arranged as the uppermost layer in an integral colour photographic recording material, in which case the material is preferably exposed through the transparent layer support.

EXAMPLE 1

Image receptor sheet 1

The following layers were applied to a paper support which was coated with polyethylene on both sides. All the figures given are based on 1 m².

(1) Layer of mordant containing 6 g of cationic polyurethane according to Example 3 of DE-A 2 631 521 and 5 g of gelatine.

(2) Hardening layer containing 0.1 g of gelatine and 0.15 g of instant hardener having the structure:

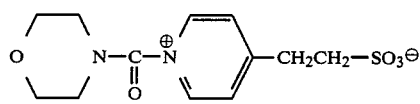

Two strips of the resulting image receptor material were immersed in each case in 0.03 molar solutions, which had been made alkaline with 2% sodium hydroxide solution, of dyes A, B, C and D (comparison dyes according to US-A-4 207 104 and Research Disclosure 17 334 (September 1978)) and dyes 1, 2, 3, 4, 5 and 10 according to the invention, until the layer had a density of at least 1.0 measured behind a blue filter after drying.

Comparison dyes:

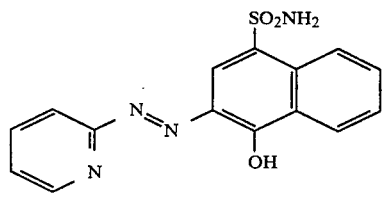
A:

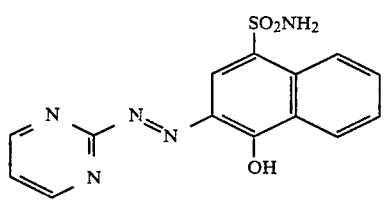
B:

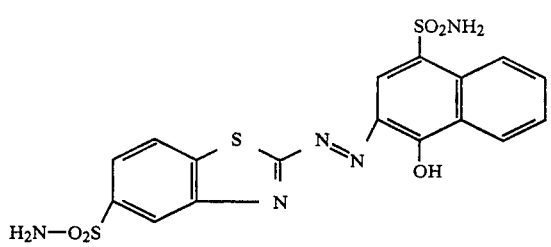
C:

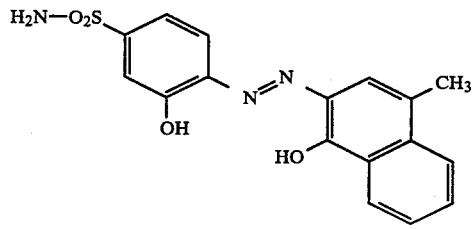
D:

The strips were subsequently metallized by immersion in 2% nickel acetate solution for 30 seconds, rinsed with water and dried.

Half the strips were in each case exposed to high intensity illumination in a Xeno test apparatus, using a radiation dose of $4.8.10^6$ Lux hours (1×.h).

The properties in percent (absorption maximum and half band width in nm, density increase on metallization (measured behind a green filter)), the subsidiary densities measured behind blue and red filters and the relative density loss in percent measured at high intensity illumination, and the dye transfers obtainable with the individual dyes after metallization with nickel are summarized in the following Table.

As may be seen from a comparison of the metallized dye transfers, none of the dyes according to the invention shows a density loss of more than 9% after 48 hours in the Xeno test apparatus whereas the hetarylazonaphthols according to US-A-4 207 104 suffer a density loss ranging from 23 to 48%.

TABLE 1

| | Ni-metallized dyes | | Subsidiary densities Behind | | Relative density change in the |
|---|---|---|---|---|---|
| Dye | $\lambda_{max}$ [nm] | Half band width | blue filter | red filter | Xenon test |
| A | 534 + 570 | 470–600 | 38% | 20% | −23% |
| B | 534 + 570 | 465–600 | 41% | 22% | −48% |
| C | 547 | 469–628 | 47% | 53% | −37% |
| D | — | — | — | — | −12% |
| 1 | 515 | 450–569 | 74% | 6% | −4% |
| 2 | 560 | 439–612 | 66% | 45% | −5% |
| 3 | 520 | 464–579 | 56% | 23% | ±0% |
| 4 | 520 | 460–581 | 60% | 28% | −9% |
| 5 | 530 | 461–573 | 55% | 23% | ±0% |
| 10 | 538 | 464–584 | 35% | 15% | ±0% |

EXAMPLE 2

Light-sensitive element 1 (not according to the invention)

The following layers were applied in succession to a paper support which has been coated on both sides with polyethylene. All figures are based on 1 m².

1. A green-sensitized silver iodobromide emulsion layer of 0.6 g of AgNO₃ containing 0.18 g of dye-releaser E which is not according to the invention, 0.13 g of ED compound ED 6 (=Compound 4 of DE-A-3 006 268), 0.40 g of palmitic acid diethylamide and 0.92 g of gelatine.

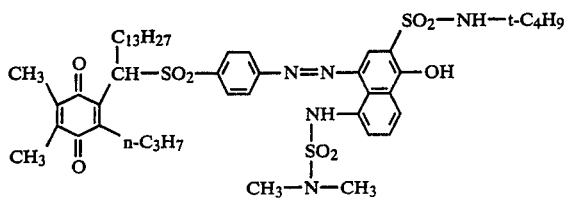

Dye-releaser E

2. A protective layer containing 0.6 g of the monoacetylation product of 4-methyl-4-hydroxymethylphenidone, 0.12 g of 2-isooctadecyl-5-sulphohydroquinone and 0.6 g of gelatine.

3. A hardening layer containing 0.1 g of gelatine and 0.12 g of instant hardener corresponding to the formula:

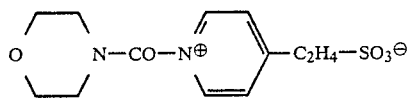

Light-sensitive element 1, which had been exposed imagewise through a step wedge, and an image receptor sheet as described in Example 1 were impregnated with a treatment solution having the composition indicated below and pressed together with their active surfaces in contact:

925 g of H₂O,
30 g of isobutanol,
2 g of Na₂SO₃,
3 g of KBr
40 g of KOH.

After a contact time of 2 minutes, the sheets were separated and the image receptor sheet was washed for 30 seconds. After drying, the $D_{min}/D_{max}$ values of the positive magenta dye image were measured (Dye image 1).

Light-sensitive element 2 (according to the invention)

Light-sensitive element 2 differs from light-sensitive element 1 in that its layer 1 has the following composition:

1. A green-sensitized silver iodobromide emulsion of 0.8 g of AgNO₃ containing 0.33 g of the dye-releaser 1, 0.27 g of ED compound ED 6, 0.6 g of palmitic acid diethylamide and 1.6 g of gelatine. The element was processed by a method analogous to that used for the light-sensitive element 1. Separation of the layers was followed by brief washing with demineralized water, metallization by immersion in a 2% nickel-II acetate solution, further washing and drying.

The results obtained with the light-sensitive elements 1 and 2 (colour images 1 and 2) are compared below:

| Colour image | Dye-releaser | $D_{min}$ | $D_{max}$ | E | $\frac{\Delta D}{Do}$ |
|---|---|---|---|---|---|
| 1 | E | 0.11 | 1.80 | 100 | −49% |
| 2 | 1 | 0.14 | 1.86 | 60 | −6% |

The sensitivity E in column 5 is given in relative log I.t units.

Column 6 gives the percentage decrease in density resulting from exposure to Xenon light (7.2.10⁶ 1×.h).

The magenta colour image obtained from the light-sensitive element 2 has a photostability which is improved by a factor of at least 7 compared with that of conventional magenta monoazo dyes.

We claim:

1. A colour photographic recording material for the production of colour images by the dye diffusion transfer process, containing, in association with at least one light-sensitive silver halide emulsion layer, a non-diffusible, colour-providing compound from which a diffusible monoazo dye capable of forming complexes with metal ions is released under the conditions of alkaline development as a function of the development of the silver halide emulsion layer, characterised in that the monoazo dye corresponds to the following formula (I):

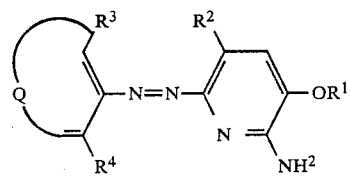

wherein
Q represents the group required for completing a phenyl or naphthyl group,
R¹ represents H,
R² represents H, halogen or an alkyl- or aryl-sulphonyl group, and
R³ and R⁴ (identical or different) represent H or a substituent incapable of chelate formation.

2. A recording material according to claim 1, characterised in that the monoazo dye corresponds to the following formula (II):

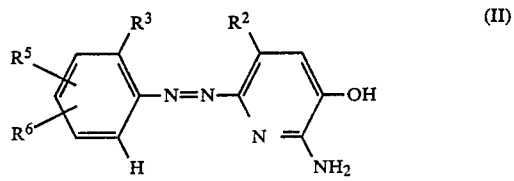

wherein
R² represents H, halogen or an alkyl- or aryl-sulphonyl group,
R³ represents H, halogen, alkyl, alkoxy, CN, CF₃ or carbamoyl, or R³ and R⁵ together represent a group for completing a condensed benzene ring, and
R⁵ and R⁶ (identical or different) represent H, halogen, CN, carbalkoxy, carbamoyl, sulphinic acid (sulphinyl), sulphonic acid (sulphonate), sulphamoyl, alkyl- or aryl-sulphonyl or (in the m-position to the azo group) NO₂, or R⁵ together with R³ or together with R⁶ represents a group for completing a condensed benzene ring.

3. The method of producing a light-stable magenta image by dye diffusion processing of an imagewise exposed color photographic recording material containing, associated with at least one light-sensitive silver halide emulsion layer, a non-diffusible color providing compound while in contact with a supported image receptor layer, the method comprising the step of releasing from said non-diffusible color providing compound under alkaline development conditions a diffusible magenta dye corresponding to the following formula

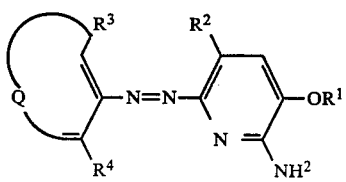

wherein
- Q represents the group required for completing a phenyl or naphthyl group,
- $R^1$ represents H,
- $R^2$ represents H, halogen or an alkyl- or aryl-sulphonyl group, and
- $R^3$ and $R^4$ (identical or different) represent H or a substituent incapable of chelate formation, and transferring at least part of said released azo dye to said image receptor layer and forming complexes with metal ions.

* * * * *

UNITED STATES PATENT AND TRADEMARK OFFICE
CERTIFICATE OF CORRECTION

PATENT NO. : 4,521,506

DATED : June 4, 1985

INVENTOR(S) : Rudolf Stolzenburg, et al.

It is certified that error appears in the above—identified patent and that said Letters Patent is hereby corrected as shown below:

Column 20, line 4, "spargingly" should read -- sparingly --

Claim 1 at Column 24, lines 15 - 23, the left-hand side of Formula (I) should read as follows:

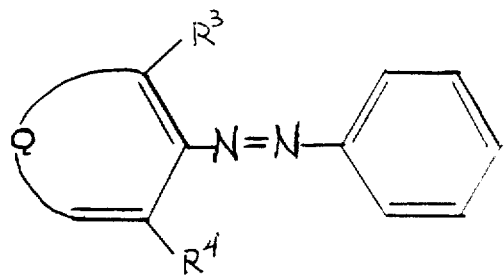

UNITED STATES PATENT AND TRADEMARK OFFICE
CERTIFICATE OF CORRECTION

PATENT NO. : 4,521,506

DATED : June 4, 1985

INVENTOR(S) : Rudolf Stolzenburg, et al

It is certified that error appears in the above-identified patent and that said Letters Patent is hereby corrected as shown below:

Claim 3 at Column 25, lines 5 - 11, the left-hand side of Formula (I) should read as follows:

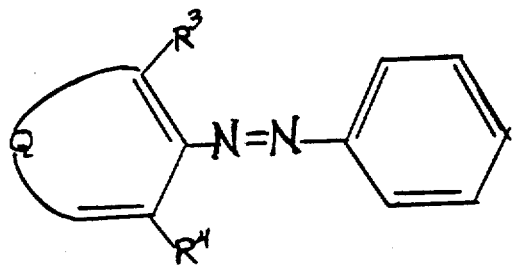

Signed and Sealed this

Seventh Day of November, 198

*Attest:*

JEFFREY M. SAMUELS

*Attesting Officer*     *Acting Commissioner of Patents and Trademarks*